US012766558B2

(12) United States Patent
Jonkka et al.

(10) Patent No.: US 12,766,558 B2
(45) Date of Patent: Oct. 20, 2026

(54) ELECTRIC VIBRATION MACHINERY FOR MINERAL MATERIAL PROCESSING DEVICE

(71) Applicant: METSO FINLAND OY, Espoo (FI)

(72) Inventors: Jari Jonkka, Espoo (FI); Jonne Ketola, Espoo (FI)

(73) Assignee: Metso Finland Oy, Espoo (FI)

( * ) Notice: Subject to any disclaimer, the term of this patent is extended or adjusted under 35 U.S.C. 154(b) by 0 days.

(21) Appl. No.: 19/113,679

(22) PCT Filed: Sep. 27, 2023

(86) PCT No.: PCT/FI2023/050547
§ 371 (c)(1),
(2) Date: Mar. 20, 2025

(87) PCT Pub. No.: WO2024/069052
PCT Pub. Date: Apr. 4, 2024

(65) Prior Publication Data

US 2026/0091409 A1 Apr. 2, 2026

(30) Foreign Application Priority Data

Sep. 28, 2022 (FI) ...................................... 20225846

(51) Int. Cl.
*B07B 1/42* (2006.01)
*B07B 1/28* (2006.01)
*H02K 7/06* (2006.01)

(52) U.S. Cl.
CPC ................ *B07B 1/42* (2013.01); *B07B 1/286* (2013.01); *H02K 7/061* (2013.01)

(58) Field of Classification Search
CPC .................................. B07B 1/286; B07B 1/42
(Continued)

(56) References Cited

U.S. PATENT DOCUMENTS 2,958,228 A 11/1960 Carrier, Jr.
3,481,468 A 12/1969 Tonjes
(Continued)

FOREIGN PATENT DOCUMENTS

CN 204746819 U 11/2015
CN 206139477 U 5/2017
(Continued)

OTHER PUBLICATIONS

Search Report for Finnish Patent Application No. 20225846, dated Apr. 28, 2023.
(Continued)

*Primary Examiner* — Molly K Devine
(74) *Attorney, Agent, or Firm* — Andrus Intellectual Property Law, LLP

(57) ABSTRACT

A belt or chain driven mineral material processing device vibrator. The vibrator includes a vibrator shaft drive wheel configured to reside at least partially in a radial direction around a bearing of a vibrator shaft that extends through a device frame of a mineral material processing device. An eccentric is configured to be mounted to the vibrator shaft so that the eccentric extends in axial direction of the vibrator shaft beyond the vibrator shaft drive wheel outwards of the device frame. A method for vibrating a mineral material processing device by a belt or chain, a method for producing a belt or chain driven mineral material processing device vibrator, a method for controlling a belt or chain driven mineral material processing device vibrator, and a mobile mineral material processing plant including the mineral material processing device vibrator are also disclosed.

20 Claims, 4 Drawing Sheets

(58) Field of Classification Search
USPC .................................................. 209/324, 346
See application file for complete search history.

(56) References Cited

U.S. PATENT DOCUMENTS

| | | | |
|---|---|---|---|
| 8,083,072 | B2 | 12/2011 | Botton |
| 11,224,896 | B2 | 1/2022 | Carter |

FOREIGN PATENT DOCUMENTS

| | | | |
|---|---|---|---|
| CN | 213161809 | U | 5/2021 |
| CN | 113751313 | A | 12/2021 |
| EP | 3566784 | A1 | 11/2019 |

OTHER PUBLICATIONS

Office Action for Finnish Application No. 20225846, dated Nov. 7, 2024.
International Search Report and Written Opinion for International Application No. PCT/FI2023/050547, mailed Jan. 2, 2024.
International Preliminary Report on Patentability for International Application No. PCT/FI2023/050547, mailed Jan. 10, 2025.

200

300

ELECTRIC VIBRATION MACHINERY FOR MINERAL MATERIAL PROCESSING DEVICE

CROSS-REFERENCE TO RELATED APPLICATIONS

This application is the U.S. national stage application of International Application PCT/FI2023/050547, filed Sep. 27, 2023, which international application was published on Apr. 4, 2024, as International Publication WO 2024/069052 A1 in the English language. The International Application claims priority of Finnish Patent Application No. 20225846 filed Sep. 28, 2022.

TECHNICAL FIELD

The present disclosure generally relates to a belt or chain driven mineral material processing device vibrator.

BACKGROUND

This section illustrates useful background information without admission of any technique described herein representative of the state of the art.

Vibrators are used to shake different mineral material processing devices such as screens to facilitate material processing. For instance, screen vibrators are provided to shake one or more screen media of a screen to transport an oversize fraction along the screen and an undersize fraction through the screen media. Vibrators may also be provided to promote material transport through a feeder or along a conveyor.

The vibrators are typically driven by a rotating drive that rotates an eccentric system such that vibration is induced through inertia of the eccentric system. The eccentric system comprises one or more acentric masses. It is desirable to invoke shaking action symmetrically about a centre line of the screen. For example, a shaft may pass through opposite sides of a screen frame and support one or more eccentric masses. The eccentric masses may reside between the opposite sides of the screen frame. Alternatively, or additionally, eccentric masses may sandwich the screen frame residing outside of the screen frame. It may be advantageous to locate the eccentric masses outside the screen frame so as to reduce space requirement inside the screen or enhance shaking force as a function of eccentricity of the mass.

When driving a shaft that supports eccentric masses outside of the screen frame, the masses are typically supported to the shaft immediately adjacent to the screen frame so as to reduce adverse forces on bearings of the shaft. Moreover, the closer the eccentric resides to the screen frame, the less thickness is required in the shaft for sufficient stiffness. As the purpose is to shake the screen media, any mass increase in the system is counter productively declining shaking accelerations. It is thus logical to position the eccentric masses immediately adjacent to the screen frame and to place a drive pulley behind the eccentric. However, when the drive of the eccentric is implemented with an electric motor that is longer than a combination of the eccentric and the drive pulley, width of the screen may be increased by a drive system of the screen. If the electric motor is radially offset and axially extending from a level of the drive pulley, motor needs to be mounted apart from the screen frame by the axial length of the eccentric. On the other hand, if the motor is mounted in a reversed direction, cooling of the motor may be hindered by obstructing airflow into a tail end of the motor. The shaft needs to be extended to bring the drive pulley in line with that of the motor.

New improvements or alternatives are desired to enable making more compact or alternative drive systems for screen vibrators.

SUMMARY

The appended claims define the scope of protection. Any examples and technical descriptions of apparatuses, products and/or methods in the description and/or drawings not covered by the claims are presented not as embodiments of the invention but as background art or examples useful for understanding the invention.

According to a first example aspect there is provided a belt or chain driven vibrator for a mineral material processing device as defined by appended claim 1.

The drive wheel may be a pulley for a belt or a chain sprocket.

The bearing may comprise a bearing case. The bearing may comprise a plurality of rollers or balls. The vibrator shaft drive wheel may be configured to reside at least partially in radial direction around the bearing case. The vibrator shaft drive wheel may be configured to reside at least partially in radial direction around the rollers or balls of the bearing.

Advantageously, by arranging the vibrator shaft drive wheel at least partly around the bearing, the vibrator shaft drive wheel and the eccentric may be brought closer to the device frame. Eccentric loads on the bearing may consequentially be reduced.

The vibrator shaft drive wheel may comprise two peripheral flanges that define a belt groove. The belt groove may reside axially between the device frame and a mass centre of the eccentric. The belt groove may reside axially closer to the device frame than the mass centre of the eccentric.

The vibrator may be belt-driven. The belt groove may be adapted for a multi-rib belt. The belt groove may be adapted for a two-rib belt. The flanges may radially extend from a cylindrical part. The cylindrical part may be flush with an inward one of the peripheral flanges. The flanges may be attached to the cylindrical part, e.g., by welding. The cylindrical part may extend outwards of an outer one of the peripheral flanges by a length that is greater than a width occupied by the flanges and the groove. The vibrator may further comprise the belt. The vibrator may comprise two belts. Two belts may allow using reasonably inexpensive belts while reserving a narrow axial space in direction of the vibrator shaft. The vibrator may comprise three belts. Three belts may enable using yet more inexpensive belts or extend the life of the belts while still keeping the total axial space within reasonable limits. The vibrator may comprise four belts. Four belts may still keep the required axial space within allowable tolerance of the vibrator shaft bearings considering the centrifugal forces induced by the eccentric. With four belts, the operation may continue even if one of the belts would break down. The vibrator may comprise 1 to 4 belts. Alternatively, the vibrator may be chain-driven. The vibrator may comprise the chain. Alternatively, the vibrator may comprise two or three chains. Advantageously, with two or three chains, redundancy may be increased so that chain strength requirements may be reduced and/or breaks in production can be reduced by enabling the vibrator to operate even if one of the chains broke down.

The mineral material processing device may be a screen, a feeder, and/or a conveyor.

The vibrator shaft drive wheel may be integrated with the eccentric. The vibrator shaft drive wheel may be attachable to the eccentric. The eccentric may be recessed to at least partially receive an outward side of the vibrator shaft drive wheel. The eccentric may comprise a recess configured to radially align the vibrator shaft drive wheel with the eccentric. The recess may be semi-circular. The recess may further enable bringing the eccentric closer to the device frame.

Bringing the eccentric closer to the device frame may be particularly useful with multi-rib belts that require more width than single rib belts do.

The eccentric may comprise a shaft attachment structure. The shaft attachment structure may comprise a clamp configured to attach the eccentric to the vibrator shaft. The shaft attachment structure may also couple the vibrator shaft drive wheel to the vibrator shaft.

The eccentric may comprise a semi-circular plate part. The plate part may define the recess. The plate part may integrally form the shaft attachment structure. The eccentric may comprise an arc part. The arc part may be attached to the plate part. The arc part may be semi-circular. The arc part and the plate part may be radially aligned. The arc part may be integrally formed with the plate part.

The eccentric may be mounted such that its centrifugal force vector is formed at a proximate distance to a bearing point of the bearing. The proximate distance may be at most 115 mm. The proximate distance may be at most 110 mm. The proximate distance may be at least 108 mm. The proximate distance may be at least 110 mm.

The mineral material processing device vibrator may further comprise a cradle for an electric motor. The cradle may be attachable to the device frame. The cradle may be made of a metal plate. The metal may be or comprise steel; aluminium; or an alloy of a plurality of different metals. The cradle may be attachable to an outward side of the device frame. The cradle may be attachable to the device frame by bolts, rivets, or welding. The cradle may define at least a partial drive wheel case. The cradle may comprise drive wheel tightening mechanism. The drive wheel tightening mechanism may comprise a motor attachment plate. The motor attachment plate may be slidable or rotatable connector configured to connect the motor attachment plate to a counter structure comprised by the cradle. The cradle may comprise a belt tensioner. The belt tensioner may comprise a rotatable tension adjustment element. The cradle may comprise a chain tensioner. The chain tensioner may comprise a rotatable tension adjustment element. The rotatable tension adjustment element may be threaded. The counter structure may be defined by the drive wheel case. The cradle may be configured to attach the electric motor from its front end through which rotating drive is provided by the electric motor. The cradle may be configured to attach the electric motor to the device frame so that a shaft of the electric motor is spaced apart from the device frame by a motor gap. The motor gap may be at least 1 mm; 2 mm; 5 mm; or 10 mm. The motor gap may be at most 2 mm; 5 mm; 10 mm; 20 mm; or 40 mm. The motor may have a motor shaft. The motor shaft may drive the device vibrator by the belt. The motor shaft may drive the device vibrator by the chain. The motor shaft may extend axially beyond the bearing.

The mineral material processing device vibrator may fit within a transportation width defined by other parts of the device.

The vibrator may further comprise the vibrator shaft. The belt or chain driven vibrator may further comprise a second eccentric. The second eccentric may be configured to be mounted to an opposite end of the vibrator shaft. The vibrator may comprise two eccentrics configured to operate on opposite sides of the device frame. The two eccentrics may be identical. The two eccentrics may be attachable at same distance from the device frame. The second eccentric may be attachable closer to the device frame than the first eccentric. The vibrator shaft drive wheel may be configured to drive a first eccentric through an interlink connecting the vibrator shaft drive wheel with the first eccentric. The vibrator shaft drive wheel may be configured to drive the second eccentric through the vibrator shaft.

According to a second example aspect, there is provided a method for vibrating a mineral material processing device by a belt or a chain, comprising

- supporting a vibrator shaft drive wheel at least partially in radial direction around a bearing of a vibrator shaft that extends through a device frame of a mineral material processing device;
- supporting an eccentric to the vibrator shaft so that the eccentric extends in axial direction of the vibrator shaft beyond the vibrator shaft drive wheel outwards of the device frame; and
- rotating the eccentric by the vibrator shaft drive wheel.

The method may further comprise coupling the vibrator shaft drive wheel and the eccentric so that the vibrator shaft drive wheel and the eccentric are at least partially interlaced.

According to a third example aspect, there is provided a method for producing a mineral material processing device vibrator, comprising

- mounting a vibrator shaft drive wheel to at least partially in radial direction around a bearing of a vibrator shaft that extends through a device frame of a mineral material processing device; and
- mounting an eccentric to the vibrator shaft so that the eccentric extends in axial direction of the vibrator shaft beyond the vibrator shaft drive wheel outwards of the device frame.

According to a fourth example aspect, there is provided a mineral material processing device comprising the mineral material processing device vibrator.

According to a fifth example aspect, there is provided a screen comprising a (belt or chain driven) mineral material processing device vibrator.

According to a sixth example aspect, there is provided a mobile mineral material processing plant comprising a mineral material processing device vibrator.

The mineral material processing plant may be mobile. The mineral material processing plant may be self-propelling. The mineral material processing plant may be towable.

Different non-binding example aspects and embodiments have been illustrated in the foregoing. The embodiments in the foregoing are used merely to explain selected aspects or steps that may be utilized in different implementations. Some embodiments may be presented only with reference to certain example aspects. It should be appreciated that corresponding embodiments may apply to other example aspects as well.

BRIEF DESCRIPTION OF THE FIGURES

Some example embodiments will be described with reference to the accompanying figures, in which.

DETAILED DESCRIPTION

In the following description, like reference signs denote like elements or steps.

Figure 1A:
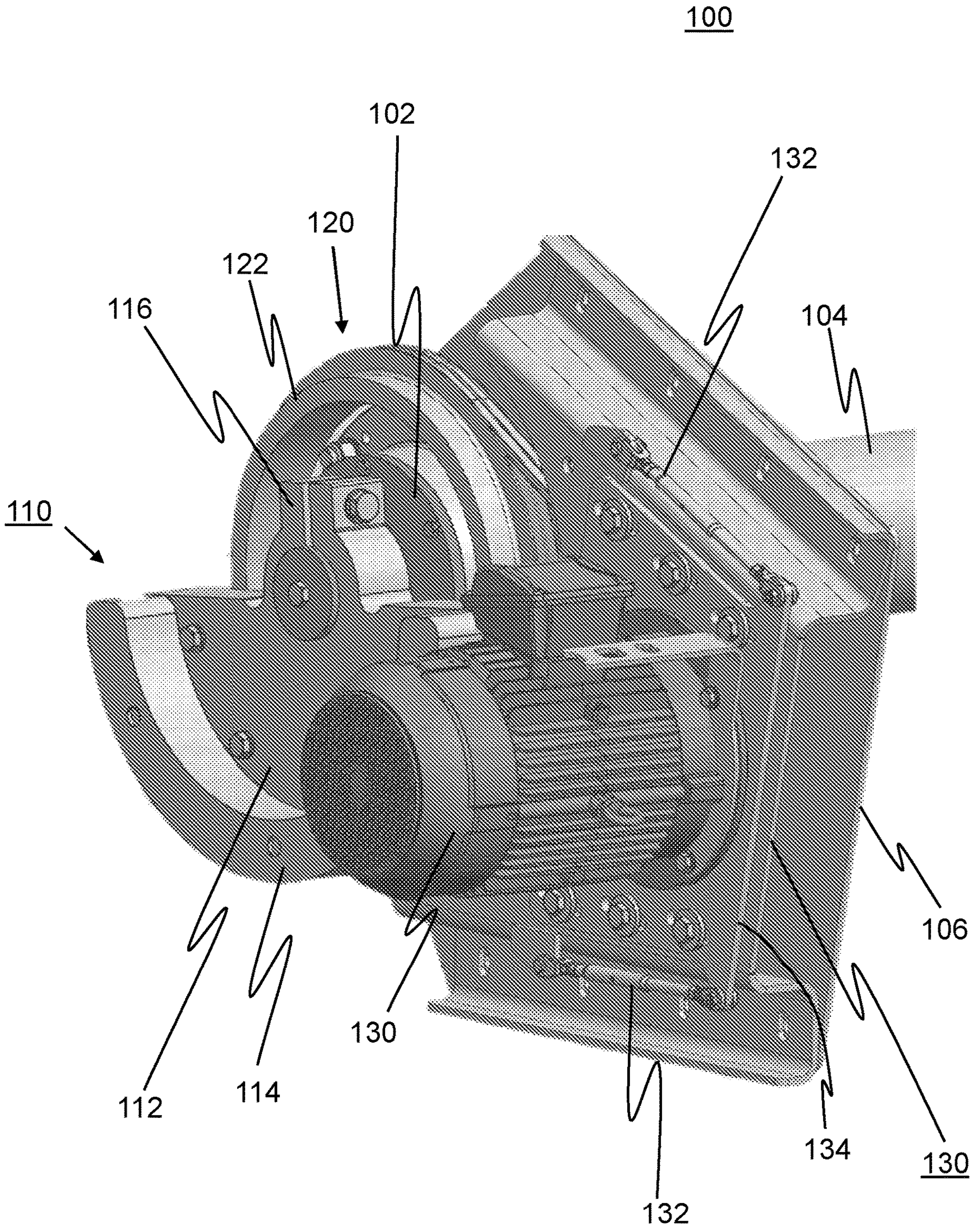
FIG. 1*a* schematically shows a belt driven mineral material processing device vibrator according to an example embodiment from one perspective.
Figure 1B:
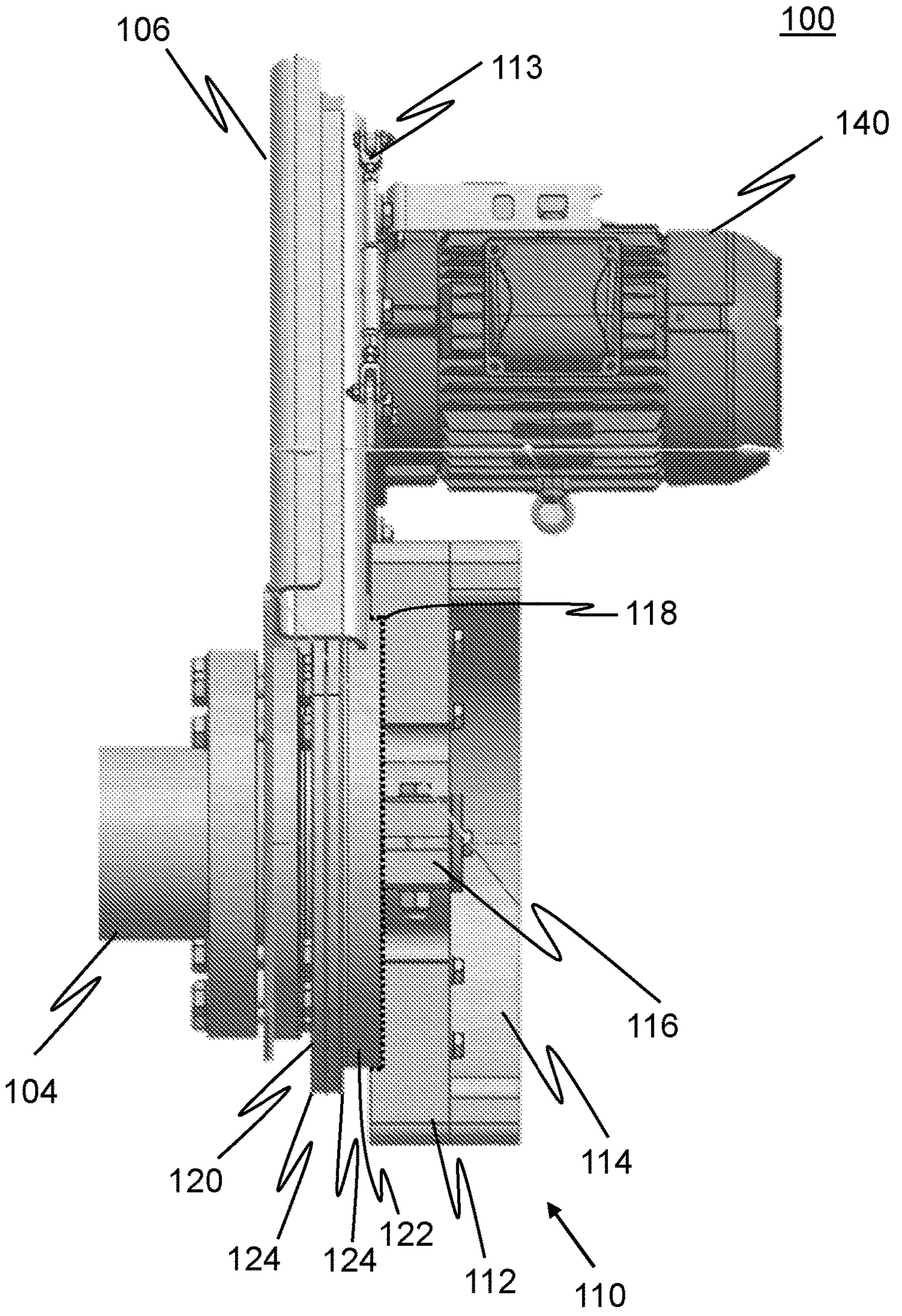
FIG. 1*b* schematically shows a belt driven mineral material processing device vibrator according to an example embodiment from another perspective.

FIGS. 1*a* and 1*b* show a belt driven mineral material processing device vibrator 100. FIG. 1*a* and FIG. 1*b* show the same belt driven mineral material processing device vibrator from two different perspectives. The belt driven mineral material processing device vibrator 100 comprises an eccentric 110 and a vibrator shaft drive wheel 120. In the example embodiment of FIGS. 1*a* and 1*b*, the vibrator shaft drive wheel 120 is a vibrator shaft pulley. The vibrator 100 comprises vibrator shaft 102 and a bearing 102 for rotatably supporting the vibrator shaft. The vibrator shaft 102 supports the eccentric 110 and the vibrator shaft drive wheel 120. The vibrator shaft drive wheel 120 is configured to reside at least partially in radial direction around the bearing 102. The vibrator shaft 104 extends through a device frame 106. In an alternative embodiment (not shown), the device vibrator is chain driven and the vibrator shaft drive wheel 120 is a chain sprocket.

The eccentric 110 is configured to be mounted to the vibrator shaft 104. The eccentric 110 extends in axial direction of the vibrator shaft 104 beyond the vibrator shaft drive wheel 120 outwards of the device frame 106. The centre of a drive medium (belt, chain) of the vibrator shaft drive wheel 120 is configured to reside closer to the device frame 106 than the centre of mass of the eccentric 110 in an axial direction of the vibrator shaft 104. The vibrator shaft drive wheel 120 is attached to the eccentric 110.

In an embodiment, the bearing 102 comprises a bearing case. In an embodiment, the vibrator shaft drive wheel 120 is configured to reside at least partially in a radial direction around the bearing case.

The vibrator shaft drive wheel 120 comprises a cylindrical part 122 and two peripheral flanges 124 (FIG. 1*b*) that define a belt groove therebetween. In an example embodiment, the belt groove is configured to reside between the device frame 106 and the eccentric 110. In an example embodiment, the belt groove is configured to reside closer to the device frame 106 than (the mass of) the eccentric 110. In other words, the eccentric of the vibrator 100 may be configured by its entire mass to induce vibration resides beyond the belt groove in an axial direction of the vibrator shaft 104 outwards from the device frame 106.

The belt groove is adapted for a two-rib belt. A two-rib belt is relatively durable and strong, although requires more axial space than a one-rib belt does. Due to the increased axial space requirement, the vibrator 100 shown in FIGS. 1*a* and 1*b* is particularly advantageous in bringing a mass centre of the eccentric 110 closer to the bearing 102. Alternatively, the vibrator may comprise one belt. The vibrator may comprise two belts. The vibrator may comprise three belts. The vibrator may comprise four belts. The vibrator may comprise 1-4 belts. The vibrator may be chain-driven. The vibrator may comprise the chain or a plurality of chains, if more than one chains are used to drive the vibrator.

The eccentric 110 comprises a semi-circular plate part 112 and an arc part 114 that are attached or integrated together. In an example embodiment, the plate part 112 defines the recess 118. In FIG. 1*a*, the plate part 112 integrally forms the shaft attachment structure. The arc part 114 is attached to the plate part 112. In FIG. 1*a*, the arc part 114 is semi-circular. The arc part 114 and the plate part 112 are radially aligned.

FIG. 1*b* also shows that the eccentric 110 defines a recess 118. The recess is indicated in FIG. 1*b* with an additional dashed line for clarity. The recess 118 is configured to radially align the vibrator shaft drive wheel 120 with the eccentric 110. The recess 118 is semi-circular. The recess further enables bringing the eccentric 110 closer to the device frame 106.

Figure 1C:
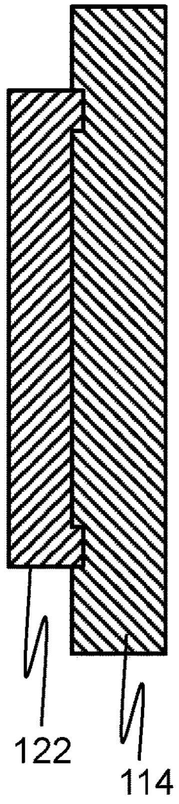
FIG. 1*c* illustrates a cross-section of an eccentric according to an example embodiment.

FIG. 1*c* illustrates a cross-section of the cylindrical part 122 partly recessed into the arc part 114 of the eccentric.

In an example embodiment, the eccentric 110 comprises a shaft attachment structure, such as a clamp 116. The clamp 116 is configured to attach the eccentric 110 to the vibrator shaft 104. The shaft attachment structure also couples the vibrator shaft drive wheel 120 to the vibrator shaft 104.

In an example embodiment, the vibrator 100 further comprises a cradle 130 for an electric motor 140. The cradle 130 is attached to an outward side of the device frame 106, e.g., by bolts. In FIG. 1*a*, the cradle 130 defines a partial drive wheel case. The electric motor 140 is attached to the cradle 130 by its front end through which rotating drive is provided by the electric motor 140. The cradle 130 attaches the electric motor 140 to the device frame 106 so that a shaft of the electric motor is spaced apart from the device frame 106 by a motor gap (not shown). The cradle 130 comprises pulley tightening mechanism that is implemented in FIG. 1*a* using two pulley tighteners 132. In FIG. 1*a*, the pulley tightening mechanism further comprises a motor attachment plate 134. In FIG. 1*a*, the motor attachment plate 134 slidably attaches the electric motor 140 to a counter surface provided by the cradle 130. In an example embodiment, the motor attachment plate 134 comprises a pivot attachment configured to pivotably attach the electric motor 140 to the counter surface. The counter structure may be defined by the pulley case.

In an example embodiment, the cradle comprises a belt tensioner. In an example embodiment, the belt tensioner comprises a rotatable tension adjustment element that may be threaded. In an alternative embodiment (not shown), the cradle comprises a chain tightening mechanism. In a further alternative example, the chain tensioner comprises a rotatable tension adjustment element that may be threaded.

The motor may comprise a motor shaft (not shown). The motor shaft may drive the eccentric 110 by the belt. Alternatively, the motor may drive the eccentric 110 by the chain. The motor shaft may extend axially beyond the bearing 102.

Figure 2:
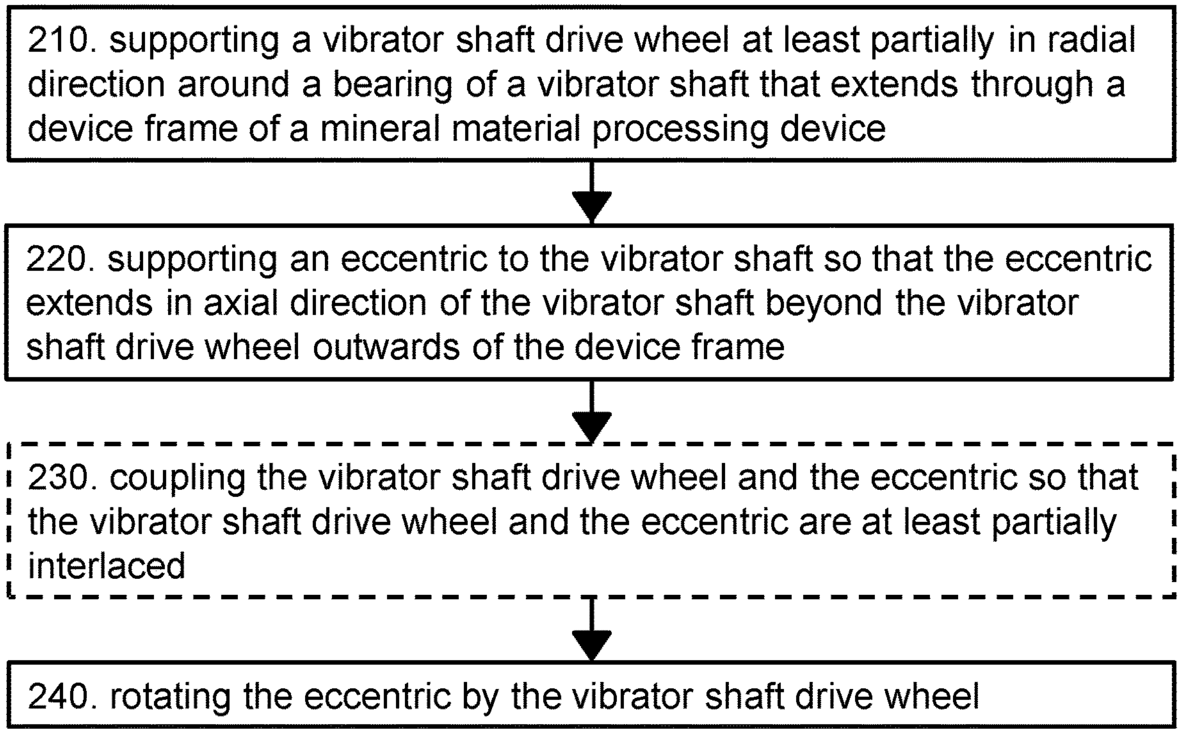
FIG. 2 shows a block diagram of a method for vibrating a mineral material processing device by a belt or a chain according to an embodiment.

FIG. 2 shows a block diagram of a method 200 for vibrating a mineral material processing device by a belt. The mineral material processing device may be a screen, a feeder, or a conveyor. In an alternative embodiment, the mineral material processing device is vibrated by a chain. The method 200 comprises a first step 210 of supporting a vibrator shaft drive wheel at least partially in radial direction around a bearing of a vibrator shaft that extends through a device frame of a mineral material processing device and a second step 220 of supporting an eccentric to the vibrator shaft so that the eccentric extends in axial direction of the vibrator shaft beyond the vibrator shaft drive wheel outwards of the device frame. The method 200 may comprise a step 230 of coupling the vibrator shaft drive wheel and the eccentric so that the vibrator shaft drive wheel and the eccentric are at least partially interlaced. Finally, the method 200 comprises a step 240 of rotating the eccentric by the vibrator shaft drive wheel.

Figure 3:
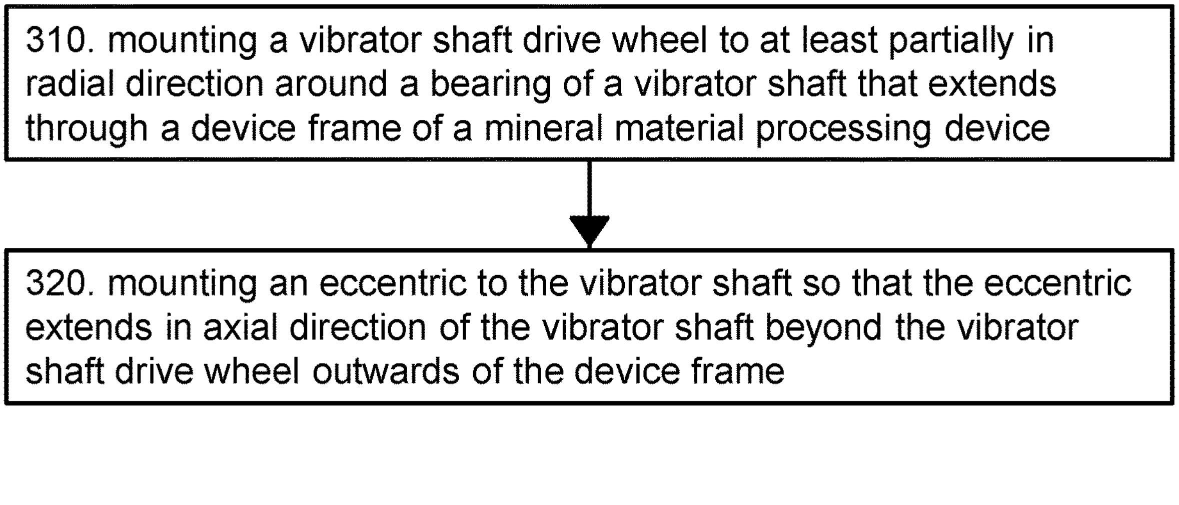
FIG. 3 shows a block diagram of a method for producing a belt or chain driven mineral material processing device vibrator according to an embodiment.

FIG. 3 shows a block diagram of a method 300 for producing a belt or chain driven mineral material processing device vibrator. The method 300 comprises a first step 310 of mounting a vibrator shaft drive wheel to at least partially in radial direction around a bearing of a vibrator shaft that extends through a device frame of a mineral material processing device. Finally, the method 300 comprises a step 320 of mounting an eccentric to the vibrator shaft so that the eccentric extends in axial direction of the vibrator shaft beyond the vibrator shaft drive wheel outwards of the device frame.

Figure 4:
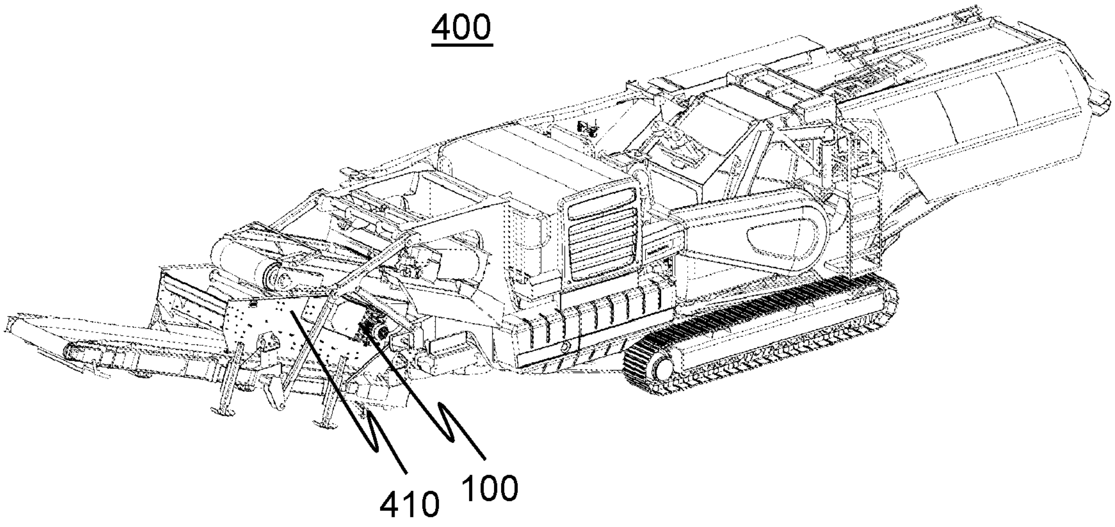
FIG. 4 schematically shows a system according to an embodiment.

FIG. 4 shows a system according to an embodiment. The system comprises a mobile mineral material processing plant 400 comprising a mineral material screen 410, and a belt-driven screen vibrator 100. The mineral material processing plant 400 may be self-propelling. The mineral material processing plant 400 may be towable. The belt-driven screen vibrator 100 may vibrate the screen 410.

Without limiting the scope and interpretation of the patent claims, certain technical effects of one or more of the example embodiments disclosed herein are listed in the following. A technical effect is smaller transport width of the mineral material processing device and improved space-saving due a vibrator shaft drive wheel configured to reside at least partially in radial direction around a bearing of a vibrator shaft. Another technical effect of some embodiments is reduced weight and more compact design in comparison to the prior art solutions. Another technical effect of some embodiments is reducing dynamic forces occurring in the bearing during the operation of the mineral material processing device under vibration. Yet another technical effect of some embodiments is reducing eccentric loads on the bearing. Still another technical effect of some embodiments reducing complexity and/or manufacturing cost.

Various embodiments have been presented. It should be appreciated that in this document, words comprise; include; and contain are each used as open-ended expressions with no intended exclusivity.

The foregoing description has provided by way of non-limiting examples of particular implementations and embodiments a full and informative description of the best mode presently contemplated by the inventors for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the invention. Furthermore, some of the features of the afore-disclosed example embodiments may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A vibrator for a mineral material processing device, comprising:
- a vibrator shaft that extends through a device frame of the mineral material processing device;
- a bearing of the vibrator shaft configured to rotatably support the vibrator shaft;
- a vibrator shaft drive wheel configured to reside at least partially in radial direction around the bearing of the vibrator shaft; and
- an eccentric configured to be mounted to the vibrator shaft so that the eccentric extends in axial direction of the vibrator shaft beyond the vibrator shaft drive wheel outwards of the device frame,
- wherein the drive wheel is configured to rotate the eccentric for inducing vibration through inertia of the eccentric.

2. The vibrator according to claim 1, wherein the drive wheel is a pulley for a belt or a chain sprocket.

3. The vibrator according to claim 1, wherein the bearing comprises a bearing case.

4. The vibrator according to claim 3, wherein the vibrator shaft drive wheel is configured to reside at least partially in radial direction around the bearing case.

5. The vibrator according to claim 1, wherein the drive wheel is a pulley and the eccentric comprises a recess configured to radially align the pulley with the eccentric.

6. The vibrator according to claim 1, wherein the drive wheel is a pulley including a cylindrical part and two peripheral flanges supported by the cylindrical part and configured to define a belt groove.

7. The vibrator according to claim 1, wherein the vibrator shaft drive wheel is integrated with the eccentric.

8. The vibrator according to claim 1, wherein device is a screen; a feeder; and/or a conveyor.

9. The vibrator according to claim 1, wherein the eccentric comprises a semi-circular plate part.

10. The vibrator according to claim 9, wherein the eccentric comprises an arc part.

11. The vibrator according to claim 10, wherein the arc part and the plate part are radially aligned.

12. The vibrator according to claim 1, wherein the eccentric comprises a shaft attachment structure.

13. The vibrator according to claim 1, wherein the eccentric is mounted such that its centrifugal force vector is formed at a proximate distance to a bearing point of the bearing, the proximate distance being at most 115 mm.

14. A mineral material processing device comprising the vibrator according to claim 1.

15. The mineral material processing device of claim 14, wherein
- the vibrator further comprises a cradle for an electric motor for driving the vibrator;
- the cradle may be attachable to an outward side of a frame of the mineral material processing device; and
- the cradle may be configured to attach the electric motor to the device frame so that a shaft of the electric motor is spaced apart from the device frame by a motor gap; and
- the motor gap is at most 40 mm.

16. The mineral material processing device of claim 14, wherein the motor gap is at most 20 mm.

17. A mobile mineral processing plant comprising the mineral material processing device vibrator according to claim 1.

18. A method for vibrating a mineral material processing device by a belt or chain, comprising:
- supporting a vibrator shaft drive wheel at least partially in radial direction around a bearing of a vibrator shaft that extends through a device frame of a mineral material processing device;

supporting an eccentric to the vibrator shaft so that the eccentric extends in axial direction of the vibrator shaft beyond the vibrator shaft drive wheel outwards of the device frame; and rotating the eccentric by the vibrator shaft drive wheel to cause vibration through inertia.

19. A method for producing a belt or chain driven mineral material processing device vibrator, comprising:

mounting a vibrator shaft drive wheel at least partially in radial direction around a bearing of a vibrator shaft that extends through a device frame of a mineral material processing device; and mounting an eccentric to the vibrator shaft so that the eccentric extends in axial direction of the vibrator shaft beyond the vibrator shaft drive wheel outwards of the device frame and wherein the drive wheel will rotate the eccentric for inducing vibration through inertia of the eccentric.

20. A method for controlling a belt or chain driven screen mineral material processing device vibrator, comprising:

measuring a speed of the belt or chain driven screen vibrator or obtaining a current driving target of the belt or chain driven screen vibrator that comprises an eccentric driven by a shaft drive wheel at least partially in radial direction around a bearing of a vibrator shaft that extends through a device frame of a mineral material processing device; and performing at least one of the following for controlling vibration induced by the vibrator through inertia:

controlling driving of the belt or chain driven screen vibrator based on at least one of the measured speed of the belt or chain driven screen vibrator; or controlling the driving of the belt or chain driven screen vibrator based on the obtained current driving target of the belt or chain driven screen vibrator.

* * * * *